United States Patent [19]
Huber et al.

[11] 3,839,242
[45] Oct. 1, 1974

[54] METHOD FOR PREPARING POLYURETHANE FOAMS

[75] Inventors: Peter Huber; Ewald Pirson, both of Burghausen, Germany

[73] Assignee: Wacker-Chemil GmbH, Munich, Germany

[22] Filed: Sept. 26, 1973

[21] Appl. No.: 400,875

[30] Foreign Application Priority Data
Sept. 21, 1972 Germany .....................2246400

[52] U.S. Cl....260/2.5 AH, 260/2.5 AP, 260/2.5 AZ, 260/448.2 R
[51] Int. Cl............................................. C08g 22/44
[58] Field of Search .... 260/2.5 AH, 2.5 AP, 2.5 AZ

[56] References Cited
UNITED STATES PATENTS

| | | | |
|---|---|---|---|
| 3,399,247 | 8/1968 | Windemuth | 260/2.5 AH |
| 3,703,486 | 12/1972 | Keil | 260/2.5 AH |
| 3,706,681 | 12/1972 | Bachura | 260/2.5 AH |
| 3,741,917 | 6/1973 | Morehouse | 260/2.5 AP |
| 3,772,224 | 11/1973 | Marlin | 260/2.5 AH |

FOREIGN PATENTS OR APPLICATIONS

| | | | |
|---|---|---|---|
| 720,212 | 2/1969 | Belgium | 260/2.5 AH |
| 294,430 | 11/1971 | Austria | |

*Primary Examiner*—M. J. Welsh
*Assistant Examiner*—C. Warren Ivy

[57] ABSTRACT

The invention relates to organopolysiloxane foam stabilizers for polyurethane foams which are obtained from the hydrolysis of mixtures of (a) silanes of the formula $R_nSiX_{4-n}$ and (b) silanes of the formula $R_3SiX$ in which R is a hydrocarbon radical, X is a hydrolyzable group and $n$ is 0 or 1.

12 Claims, No Drawings

METHOD FOR PREPARING POLYURETHANE FOAMS

The invention relates to polyether-urethane foams. More particularly it relates to a method of making cellular or foamed polyether-urethanes by adding certain organpolysiloxanes thereto as foam stabilizers and to the foamed polyether-urethane itself.

It is known that foamed polyurethanes may be prepared by reacting polyethers and polyisocyanates in the presence of gas-forming materials such as water and chemically inert volatile liquids, for example fluoroalkanes. It is also known that the pore structure of the foamed products may be controlled or modified by carrying out the foaming reaction in the presence of silicone oils or polysiloxanes of relatively high molecular weights, for example of up to 20,000. The addition of such polysiloxanes, which have a viscosity of at least 10 centistokes at 25°C. facilitates the production of foams with a uniform fine pore structure. However, certain disadvantages are associated with the use of this particular type of polysiloxane. Thus for example when such polysiloxanes are used in the preparation of foams from pre-formed polyether-polyisocyanate reaction products or prepolymers, in particular by reaction with water, the foamed products frequently shrink owing to the presence of an excessively high proportion of closed cells. This tendency to shrink is especially marked in foams of considerable thickness, for example over 12 inches thick. Such foams are difficult to treat by the crushing procedure usually required to break closed cells. Another common method for the preparation of foams comprises the reaction of polyethers and polyisocyanates in the presence of gas-forming materials such as water. The use of the relatively high molecular weight polysiloxanes in this method of preparation or in the alternative prepolymer method already referred to, is frequently ineffective since these polysiloxanes do not always stabilize the foaming mixtures sufficiently to prevent the loss of appreciable quantities of gas and the consequent formation of comparatively high density products.

Thus it is an object of this invention to provide a polyurethane foam having uniform cells. Another object of this invention is to provide a polyurethane foam which is substantially free of shrinkage. A still further object of this invention is to provide a polyurethane foam having a soft skin with sub-surface bubbles. A further object of this invention is to provide organopolysiloxanes which are stabilizers for polyurethane foams. Still a further object of this invention is to provide a method for preparing stable polyurethane foams.

The foregoing objects and others which will become apparent from the following description are accomplished in accordance with this invention, generally speaking, by providing an improved method for the preparation of polyurethane foams by the reaction of a substance having active hydrogen atoms as determined by the Zerewitinoff method with an organic polyisocyanate in the presence of a blowing agent, catalyst, cross-linking agent and foam stabilizing agents.

The foam stabilizing agents of this invention are organopolysiloxanes which are obtained from the hydrolysis of mixtures of (a) silanes of the formula $R_nSiX_{4-n}$ and (b) at least 1 mol equivalent for each X in the silanes (a) of silanes of the general formula $R_3SiX$, where R is a hydrocarbon radical, X is a hydrolyzable group and $n$ is 0 or 1. The organopolysiloxanes thus obtained have a boiling point below about 200°C. at 0.1 mm Hg (abs.).

The hydrocarbon radicals represented by R above are aliphatic hydrocarbon radicals having from 1 to 18 carbon atoms and aromatic hydrocarbon radicals. Suitable examples of aliphatic hydrocarbon radicals are alkyl radicals such as methyl, ethyl, propyl, butyl, tetradecyl and octadecyl radicals. Examples of suitable aromatic hydrocarbon radicals are aryl radicals such as phenyl.

In silanes of the formula $RSiX_3$, it is preferred that the R group be phenyl, whereas in silanes of the formula $R_3SiX$, it is preferred that the R group be methyl.

The hydrolyzable groups represented by X may be halide atoms, such as chlorine, bromine, iodine and fluorine; alkoxy groups having from 1 to 8 carbon atoms such as methoxy, ethoxy, butoxy, heptoxy and octoxy radicals; monoacyl radicals of carboxylic acids such as acetoxy, propionyloxy, valeryloxy, caproyloxy, myristoyloxy and stearoyloxy radicals and hydrogen. The types of hydrolyzable groups are not critical since these groups are split off during hydrolysis and the resulting by-products containing these groups are easily removed from the hydrolysates. However, chlorine is the preferred hydrolyzable group because of its availability. In both types of silanes (a) and (b) the R groups and the hydrolyzable groups X may be the same or different.

In the preparation of the organopolysiloxane hydrolysates, mixtures of one type or the other of silanes (a) and (b), mixtures of more than one type of silanes (a) as well as only one type of silanes (b), mixtures of only one type of silanes (a) and more than one type of silanes (b), as well as mixtures of more than one type of silanes (a) and (b) may be used.

When at least 1 mol of silane (b) is used per equivalent of X of silane (a), the resulting hydrolysates are linear or branched organopolysiloxanes.

In order to obtain the highest yield of hydrolysates having a boiling point below about 200°C. at 0.1 mm Hg (abs.), it is preferred that $n$ have a value of 1. For the same reason it is preferred that at least 1⅓ mol of silane (b) be employed for each X equivalent in silanes (a) in the production of the organopolysiloxanes of this invention.

Although it is not critical, it is preferred that the silane mixtures from which the hydrolysates of this invention are prepared, contain a maximum of 3 mols of silane (b) for each X equivalent of silanes (a).

Thus the hydrolysates which are employed in accordance with this invention are preferably prepared from phenyltrichlorosilane and trimethylchlorosilane at a mol ratio of 1:4 to 1:12 and more preferably at a mol ratio of 1:6 to 1:10.

Hydrolysates obtained from tetradecyltrichlorosilane and trimethylchlorosilane at a mol ratio of 1 to at least 3 are also suitable, since the resulting organopolysiloxane having the formula $C_{14}H_{29}Si[OSi(CH_3)_3]_3$ has a boiling point of 145°C. at 1 mm Hg (abs.) and thus does not have a boiling point above about 200°C. at 0.1 mm Hg (abs.).

The hydrolysates of this invention can be prepared by any process generally known in the art for hydrolyzing hydrolyzable silicon compounds. The use of auxiliary agents, such as organic solvents, is not necessary and is preferably omitted. It is however, advantageous to neutralize the hydrolysates prior to their use as foam stabilizers in urethane compositions. They may be neutralized, for example by washing with water, since they contain acids or bases.

Although it is not essential, it is preferred that the hydrolysates be separated from components which have a boiling point higher than 200°C. at 0.1 mm Hg (abs.) as well as from siloxanes corresponding to the formula $(R_3Si)_2O$, if indicated. This may be accomplished by distilling off the hydrolysates from the non-distillable components or from components which have a boiling point above 200°C. at 0.1 mm Hg (abs.). The resulting hydrolysates may be employed in the same amount as conventional organosilicone compounds which have been used as foam stabilizers heretofore in manufacturing polyurethane foam plastics from polyethers having an average of at least two hydroxyl groups per molecule and organic diisocyanates in the presence of interlinking agents, catalysts and water and/or foaming agents such as hydrocarbons. Generally these amounts range from about 0.2 to 1.3 parts by weight of hydrolysate for each 100 parts by weight of polyether.

The process of this invention is important in polyether cold foam systems. (The term "cold foam systems" or "cold foam" is described in "Plaste and Kautschuk," Vol. 17, pp 887/888. Cold foam systems are also referred to as "cold foaming of polyurethane foam" in DT-AS 20,14,011 and in the Anglo-Saxon literature as "cold molded urethane flexible foam," as indicated in "Journal of Cellular Plastics" May/June 1972, p 134). The organosilicone compounds which have been used heretofore as foam stabilizers in polyether cold foam systems, did not produce foams which have both fine as well as open cells, because when the foams attained the largest foam volume they hardened to such an extent that these organosilicone compounds could no longer open the cell walls.

In cold foam systems the polyethers may be branched or linear and have hydroxyl groups per molecule in which the ratio of the primary hydroxyl groups to the secondary hydroxyl groups is mostly at least 50:50; but can be up to 85:15.

Examples of suitable polyethers for use in the process of the present invention include those polyethers disclosed as suitable for the preparation of polyurethane foams in the prior art, such as polymers having terminal hydroxy groups and co-polymers of cyclic oxides such as 1,2-alkylene oxides for example ethylene oxide, epichlorhydrin, 1,2-propylene oxide, and 1,2- and 2,3-butylene oxides, oxacyclobutanes and tetrahydrofuran. Thus suitable polyethers may be prepared by polymerizing by the general methods described in the prior art one or more cyclic oxides in the presence of a difunctional compound containing two reactive hydrogen atoms per molecule, such as water, a glycol or a primary monoamine, or in the presence of a polyfunctional compound containing more than two reactive hydrogen atoms per molecule, such as ammonia, a monoalkanolamine, a polyamine or a polyhydroxy compound, for example a trihydric alcohol such as glycerol, a sugar such as sorbitol, or a phenol/formaldehyde reaction product. The process of the present invention is particularly advantageous when applied to hydroxyl-ended polyethers of molecular weights from 1000 to 8000, preferably from 1500 to 6000.

Especially valuable are the polyethers obtained by polymerisation of 1,2-propylene oxide, 1,2- and 2,3-butylene oxide or mixtures of these oxides with each other and/or with minor proportions of other alkylene oxides such as ethylene oxide.

Suitable organic polyisocyanates for use in the process of the present invention include polyisocyanates described in the prior art as suitable for use in the preparation of polyurethane foams. Examples of suitable organic polyisocyanates include aliphatic diisocyanates such as hexamethylene diisocyanate, aromatic diisocyanates such as tolylene-2,4-diisocyanate, tolylene-2,6-diisocyanate, diphenylmethane-4,4'-diisocyanate, 3-methyldiphenylmethane-4,4'-diisocyanate, m- and p-phenylene diisocyanate, chlorophenylene-2,4-diisocyanate, naphthylene-1,5-diisocyanate, diphenyl-4,4'-diisocyanate, 4,4'-diisocyanato-3,3'-dimethyldiphenyl and diphenyl ether diisocyanate and cycloaliphatic diisocyanates such as dicyclohexylmethane diisocyanate. Triisocyanates which may be used include aromatic triisocyanates such as 2,4,6-triisocyanatotoluene and 2,4,4'-triisocyanatodiphenyl ether. Examples of other suitable organic polyisocyanates comprise the reaction products of an excess of a diisocyanate with polyhydric alcohols such as trimethylolpropane, and uretedione dimers and isocyanurate polymers of diisocyanates for example of tolylene-2,4-diisocyanate. Mixtures of polyisocyanates may be used. Examples of suitable mixtures include the polyisocyanate compositions obtained by the phosgenation of the mixed polyamine reaction products of formaldehyde and one or more aromatic amines such as aniline and orthotoluidine.

Generally the organic diisocyanates in the cold foam systems are mixtures of from 30 to 70 weight percent diphenyl-methane-p,p'-diisocyanate and 70 to 30 weight percent tolylene diisocyanate-isomers.

Examples of suitable cross-linking agents are 1,4-butandiol, 2,3-butandiol, triethanolamine, neopentylglycol, trimethylolpropane, 3,3'-dichloro-4,4'-diaminodiphenylmethane and the compound represented by the formula $CH_3CH_2C(CH_2OCH_2CH_2OH)_3$. The cross-linking agents are preferably employed in amounts of from 1 to 5 parts by weight for each 100 parts by weight of polyether having on the average at least two hydroxyl groups per molecule.

Catalysts which may be used in the formation of urethane foams are the amino compounds such as triethylenediamine, N,N,N',N'-tetramethyl-1,33-butanediamine, N,N,N',N'-tetramethylethylenediamine, dimethylethanolamine, dimethylcyclohexylamine, triethylamine, dimethylpiperazine and N-methylmorpholine. Other basic compounds which may be used as catalysts are alkali metal hydroxide or a salt of a weak acid such as carbonate or acetate, or a non-basic heavy metal compound such as dibutyl tin dilaurate or manganese acetyl acetonate or stannous octoate.

The formation of the foamed products of this invention may be accomplished by reacting the polyether with excess polyfunctional isocyanates in the presence of water. The water may be used in various amounts according to the density of foamed product required but it is normally incorporated in an amount of from 1 percent to 10 percent by weight of polyether. The water may be used as the sole gas-forming agent or may be replaced wholly or in part by a non-isocyanate-reactive volatile liquid having a boiling point not greater than about 75°C., and preferably from −40°C. to 50°C., for example halogenated hydrocarbons, in particular fluorinated alkanes such as monofluorotrichloromethane, dibromodifluoromethane and 1,1,2-trichloro-1,2,2-trifluoroethane.

The process of the present invention may be carried out by the general methods more fully described in the prior art relating to the manufacture of foamed polyurethanes. Thus the polyether may first be converted to a polyether-polyisocyanate prepolymer by reaction in one or more stages with an amount of polyisocyanate in excess of the amount equivalent to the hydroxyl endgroups of the polyether. The preparation of the prepolymer may be carried out by heating the polyether and polyisocyanate together at for example 75° to 125°C., or by allowing the two materials to react without application of external heat in the presence of a catalyst for the reaction, for example a tertiary amine or a non-basic heavy metal compound such as manganese acetylacetonate. The prepolymer may then be converted to a foam by treating with the gas-forming material, if desired with the addition of more polyisocyanate. Alternatively the polyether, polyisocyanate and gas-forming material such as water may be interacted simultaneously to produce the foam in a single stage.

As is described in the prior art relating to the preparation of polyurethane foams, there may also be incorporated in the foam-forming mixture various additives such as other surfactants, for example oxyethylated phenols, oxyethylated fatty alcohols such as oleyl alcohol, fatty acid salts such as diethylamine oleate, sulphuric acid derivatives of long chain compounds such as sulphated methyl oleate, and polyalkylene oxide block copolymers, flame-retardants such as β-trichlorethyl phosphate and antimony oxide, plasticisers such as tricresyl phosphate and dioctyl phthalate, antioxidants such as alkylphenols, coloring matters and fillers such as carbon black, mica, and silica and auxiliary gas-forming agents such as lithium aluminum hydride.

The organopolysiloxanes of this invention may be incorporated with any of the other additives mentioned above or they may be incorporated separately. Thus they may be added to the polyether or the polyisocyanate before any reaction occurs or to the polyether-polyisocyanate prepolymer, or they may be blended with a mixture of other ingredients such as water and catalyst, or with for example the flame-retardant.

Various embodiments of this invention are further illustrated in the following examples in which all parts are by weight unless otherwise specified.

EXAMPLE 1

Preparation of Hydrolysates of this Invention (a) About 70 parts of water are added dropwise and under constant agitation to 211 parts of phenyltrichlorosilane and 432 parts of trimethylchlorosilane with the evolution of hydrogen chloride. About 200 parts of water are then added quickly. After stirring for a short period of time, the aqueous phase is removed and the hydrolysate is washed with 200 parts of water until the rinsing water has a pH of 7. After distilling the hydrolysate at 10 mm Hg (abs.), about 280 parts of a colorless liquid is recovered.

(b) The procedure described in (a) above is repeated, except that the silane mixture consists of 211 parts of phenyltrichlorosilane and 972 parts of trimethylchlorosilane. After distilling the hydrolysate at 5 mm Hg (abs.), about 600 parts of a colorless liquid is recovered.

COMPARISON EXAMPLE (c) The procedure described in (a) above is repeated except that the silane mixture consists of 260 parts of dimethyldichlorosilane and 324 parts of trimethylchlorosilane. Distillation was carried out at 160°C. at 12 mm Hg (abs.) due to the low boiling point of the hydrolysate. About 200 parts of a colorless liquid is recovered.

EXAMPLES 2 TO 6

In a 2 liter beaker are placed about:
1. 576 parts of a commercial polyether, which is initiated with glycerin and which consists of 20 mol percent of oxyethylene, 70 mol percent of oxypropylene units, with the remainder consisting mostly of hydroxyl groups. The polyether has the following characteristics:

| | |
|---|---|
| Molecular weight: | 4800 ± 300 |
| Hydroxyl number: | 35 ± 2 |
| Acid number: | approx. 0.1 weight percent |
| Water content: | no more than 0.1 weight percent |

(This product is commercially available under the name "Desmophen 3900.")
2. 18 parts water,
3. 24 parts triethanolamine,
4. 6 parts dimethylethanolamine,
5. 30 parts monofluorotrichloromethane and
6. 6 parts organosilicon compound.

The components are mixed at 1740 rpm in a high shearing stress mixing device (available under the name "Lenart Rapid") for 60 seconds and then quickly reacted with 342 parts of a mixture consisting of 60 percent by weight of diphenylmethane-p,p'-diisocyanate and 40 percent by weight of mixture consisting of 80 percent by weight of 2,4- and 20 percent by weight of 2,6-tolylenediisocyanate-isomers and then processed for 8 seconds at 1740 rpm in the above mentioned mixer.

The resulting low viscose mixture is then poured in a box form which is coated with an organopolysiloxane elastomer. Foaming and hardening occur within a short time without additional heat being applied. The resulting foams have the following characteristics:

TABLE

| EXAMPLE | ORGANOSILICON COMPOUND | SURFACE | SHRINKAGE | FOAM STRUCTURE |
|---|---|---|---|---|
| 2 | Example 1 (a) | even soft skin | none | fine & large percent of open cells |
| 3 | Example 1 (b) | even very soft skin | none | fine & very large percent of open cells |
| 4 | Example 1 (c) | soft skin | some | fine, almost no open cells |
| 5 | "Y6454"(*) | irregular skin | considerable | very fine, 100 percent closed cells |
| 6 | None | bubbles under skin | some | coarse cells |

(*) "Y6454" is a commercial organosilicon compound manufactured by Union Carbide Corporation.

Examples 2 and 3 of the above table show that when the organospolysiloxanes of this invention (Examples 1(a) and 1(b)) are added to a polyurethane composition, the resulting foam has a fine cell structure with a large percent of open cells and no shrinkage.

Although specific examples of the invention have been described, it is not intended to limit the invention solely thereto, but to include all the variations and modifications falling within the spirit and scope of the appended claims.

What is claimed is:

1. An improved method for the manufacture of polyurethane foams from polyethers having on the average at least two hydroxyl groups per molecule and organic diisocyanates, in the presence of organopolysiloxanes, cross-linking agents, catalysts, and blowing agents, the improvement which comprises adding as the organopolysiloxanes, hydrolysates obtained from the hydrolysis of mixtures containing (a) silanes of the general formula $R_nSiX_{4-n}$ and (b) at least 1 mol of silanes of the general formula $R_3SiX$ per equivalent of X in the silanes (a) where R is a hydrocarbon radical, X is a hydrolyzable group; and $n$ is 0 or 1, said hydrolysates having a boiling point below about 200°C. at 0.1 mm Hg (abs.).

2. The method of claim 1, wherein the hydrolysates are mixtures of phenyltrichlorosilane and trimethylchlorosilane in a mol ratio of from 1:4 to 1:12.

3. The method of claim 1, wherein the hydrolysates are mixtures of phenyltrichlorosilane and trimethylchlorosilane in a mol ratio of from 1:6 to 1:10.

4. The method of claim 1 wherein the hydrolysates are separated by distillation from non-distillable components and components having a boiling point higher than 200°C. at 0.1 mm Hg (abs.) prior to their use.

5. The method of claim 1 wherein the hydrolysates are separated by distillation from non-distillable components having a boiling point higher than 200°C. at 0.1 mm Hg (abs.) and siloxanes of the formula $(R_3Si)_2O$ prior to their use.

6. An improved method for manufacturing a polyurethane foam by the cold foam process from polyethers having an average of at least two hydroxyl groups per molecule and organic diisocyanates in the presence of organopolysiloxanes, cross-linking agents, catalysts, and blowing agents, the improvement which comprises adding as the organopolysiloxanes, hydrolysates containing (a) silanes of the general formula $R_nSiX_{4-n}$ and (b) at least 1 mol of silanes of the general formula $R_3SiX$, per equivalent of X in the silanes (a) where R is a hydrocarbon group, X is a hydrolyzable group and $n$ is 0 or 1, said hydrolysates having a boiling point below about 200°C. at 0.1 mm Hg (abs.).

7. The method of claim 6 wherein the hydrolysates are mixtures of phenyltrichlorosilane and trimethylchlorosilane in a mol ratio of from 1:4 to 1:12.

8. The method of claim 6, wherein the hydrolysates are mixtures of phenyltrichlorosilane and trimethylchlorosilane in a mol ratio of from 1:6 to 1:10.

9. The method of claim 6 wherein the hydrolysates are separated by means of distillation from the non-distillable components and components having a boiling point above 200°C. at 0.1 mm Hg (abs.) prior to their use.

10. The method of claim 1 wherein the hydrolysates are separated from the non-distillable components or components with a boiling point above 200°C. at 0.1 mm Hg (abs.), and siloxanes of the formula $(R_3Si)_2O$ prior to their use.

11. A cellular polyether-urethane foam prepared in accordance with claim 1.

12. A cellular polyether-urethane foam prepared in accordance with claim 6.

* * * * *